US012586550B2

(12) United States Patent
Renner

(10) Patent No.: US 12,586,550 B2
(45) Date of Patent: Mar. 24, 2026

(54) WALL MOUNT FOR GUITAR

(71) Applicant: Ingo Renner, Hannover (DE)

(72) Inventor: Ingo Renner, Hannover (DE)

(73) Assignee: GOELDO MUSIC GMBH, Hannover (DE)

( * ) Notice: Subject to any disclaimer, the term of this patent is extended or adjusted under 35 U.S.C. 154(b) by 288 days.

(21) Appl. No.: 18/438,420

(22) Filed: Feb. 10, 2024

(65) Prior Publication Data

US 2024/0379080 A1 Nov. 14, 2024

(51) Int. Cl.
*G10G 5/00* (2006.01)

(52) U.S. Cl.
CPC ...................................... *G10G 5/00* (2013.01)

(58) Field of Classification Search
CPC .............. G10G 5/00; G10D 1/05; G10D 1/06; G10D 1/08; G10D 1/09; G10D 1/10
See application file for complete search history.

(56) References Cited

U.S. PATENT DOCUMENTS 8,490,942 B1 * 7/2013 Henry ...................... G10G 5/00 248/443
11,769,476 B2 9/2023 Goelsdorf
2010/0163693 A1 7/2010 Wang
2022/0130358 A1 * 4/2022 Goelsdorf ................ G10D 3/00

FOREIGN PATENT DOCUMENTS

CN 205564263 A 9/2016
CN 114387942 A * 4/2022 ............. F16M 11/22
GB 2548095 A 9/2017

* cited by examiner

*Primary Examiner* — Erin Kryukova
(74) *Attorney, Agent, or Firm* — Andrew Wilford

(57) ABSTRACT

A holder for a musical instrument having a body and a neck has an anchor element, a cradle adapted to receive and support the body of the instrument and movable on the anchor element between a lower working position and an upper rest position, and a pair of arms pivotal on the anchor element between a closed position engaging around and securing the neck of the instrument supported on the cradle and an open position not surrounding the neck. Aa cable contained in the anchor element is connected between the arms and the cradle for moving the arms into the closed position on movement of the cradle into the lower position. A spring connected to the arms, cable, and/or cradle urges the cradle into the upper position and the arms into the open position so that setting the instrument body on the cradle moves same into the lower position and causes the arms to engage around the neck of the instrument.

15 Claims, 4 Drawing Sheets

WALL MOUNT FOR GUITAR

FIELD OF THE INVENTION

The present invention relates to a holder for a string instrument having a body and neck extending therefrom. More particularly this invention concerns a wall mount or stand for a guitar or the like.

BACKGROUND OF THE INVENTION

Such a stand or wall mount for a string instrument has an adjustable cradle for holding the instrument body and at least two holding arms pivotable relative to an anchor element for releasable fixation of the instrument neck received between the holding arms. The cradle and the two holding arms are coupled together by at least a connecting member, and at least one spring is provided that biases the cradle into a rest position and biases the two holding arms into an open position. The linkage that couples the cradle with the two holding arms is a cable.

The holder can be a floor stand or a wall mount. When it is a wall mount, the anchor element is regularly attached to a wall. In the case of a floor stand the anchor element is typically a frame that can be stood on a floor. In principle, the anchor element can also be connected to such a frame. In any case the anchor element as a whole functions as a fixed point or element for the two oppositely pivoting holding arms. Also the cradle can be adjusted relative to the anchor element, and namely between a rest position when not loaded and a working position when loaded, that is with the musical instrument sitting on it.

In the rest position of the cradle the two holding arms in their open position. This allows the musical instrument to be set down on the cradle. Due to the weight of the musical instrument, the cradle moves from its rest position to the working position. At the same time the two holding arms are moved from their open position into a closed position. This all happens against the force of the spring.

Such a holder and in particular a wall bracket is described in the CN 205 564 263. Here the instrument body rests on supports. As a consequence of this, the supports have articulated arms that move apart against the force of a spring. Two upper holding arms connected to the two articulated arms are thereby closed and ensure that, that an instrument neck is detachably fixed. The two articulated arms are connected to this purpose via respective cables with the holding arms.

In addition, a guide is provided that encloses the loaded spring. Two articulated arms are fit within the guide adjustably at their ends. The other ends of the two articulated arms are coupled to each other. The exposed cables from the articulated arms to the head-side holding arms lead to a not only relatively complex mechanical structure, but also to one that is prone to failure. The guide can for example get dirty, so that the adjustability and thus functionality is impaired. In addition, damage to the exposed cables is possible.

A comparable holder for a musical instrument without a cable is described in U.S. Pat. No. 8,490,942. Also in this case pivotable holding arms are provided for detachable fixation of an instrument neck. The two holding arms can be pivoted relative to an anchor element connected to a foot or floor stand. The cradle for holding the instrument body pivots when an instrument body is set on it The pivoting movement of the cradle is transmitted via an operating rod as connecting member to an angle lever, thereby pivoting the angle lever against the force of a spring. The two holding arms for fixing the instrument neck can be opened and closed. Also in this case a relatively complex mechanism is used that is susceptible to failure when dirt or the like enters it and leads to functional impairments. This is because the movement of the cradle is redirected several times, which can lead to malfunctions in the event of impairments caused by for example dust in the joints.

Finally, U.S. Pat. No. 11,769,476 of applicant has a wall mount where the connecting member designed as the cradle is rigidly coupled with the two holding arms and biased by a spring-pretensioned connecting rod and where furthermore the spring is longitudinally braced on the connecting rod. In this case, the connecting rod replaces the cable as a connecting link.

OBJECTS OF THE INVENTION

It is therefore an object of the present invention to provide an improved holder, either wall mount or floor stand, of a string instrument with a body and a neck.

Another object is the provision of such an improved wall mount or floor stand that overcomes the above-given disadvantages, in particular that is of simple constructions as well as low operating forces but provides not only perfect functionality, but remains adaptable to different variants.

SUMMARY OF THE INVENTION

A holder for a musical instrument having a body and a neck has according to the invention an anchor element adapted to be secured to a wall or stand on a floor, a cradle adapted to receive and support the body of the instrument and movable on the anchor element between a lower working position and an upper rest position, a pair of arms pivotal on the anchor element between a closed position engaging around and securing the neck of the instrument supported on the cradle and an open position not surrounding the neck, a cable at least mostly contained in the anchor element and connected between the arms and the cradle for moving the arms into the closed position on movement of the cradle into the lower position, and a spring connected to the arms, cable, and/or cradle for urging the cradle into the upper position and the arms into the open position so that setting the instrument body on the cradle moves same into the lower position and causes the arms to engage around the neck of the instrument.

Thus the invention proposes on the basis of the generic prior art of technology with a correspondingly designed holder, that the cable is guided completely or partially inside the anchor element.

As already explained above, the anchor element is a fixed point or a fixed element for the two oppositely pivotable holding arms. This is also true for the cradle that is adjustable relative to the anchor element. In addition the anchor element takes over according to the invention a further third function, functions namely as at least partial protection for the connecting cable received in its interior. As a result any functional impairments due to damage to the cable are avoided by design and from the outset.

In addition, such a cable as connecting link between the two holding arms and the cradle provides special advantages with regard to a flexible design of the holder. In fact such a cable can be easily modified with regard to its effective length if required and adapted for example to a different size bracket. This allows it to be attached to completely different musical instruments on or in the holder according to the invention. Also, a possible exchange of the adjustable cradle for a differently shaped cradle is thereby just as possible as a possible exchange of the pivotable holding arms. Both require only the attachment or detachment of the holding arms with the cable. Any size adjustments can be realized also easily, by using a cable with modified length.

In this way both the flexibility and also the functional reliability are increased enormously. This is because such cables can be operated easily and with little force and for example via deflected through corners on pulleys. This eliminates the need for intermediate deflection levers that after years of nonuse are prone to failure. In addition, cables can be optimized in terms of weight, thus have in comparison to a connecting rod significantly reduced weight, so that the design of the holder according to the invention as for example wall holder and its attachment to a wall is not difficult. Likewise the handling of the holder as floor holder or floor stand is simplified. This shows the essential advantages.

According to an advantageous embodiment the anchor element is equipped formed as a guide sleeve for the cable. In fact, the guide sleeve and the anchor element can be basically the same thing. It is also possible, that the guide sleeve is provided in addition to the anchor element and is connected to it. In most cases the guide sleeve and anchor element are basically the same thing.

Furthermore, the cradle engages with an extension stem in the guide sleeve. The extension stem may telescope inside the guide sleeve, in whole or in part. In this way the cradle can be easily moved back and forth between its rest position when not loaded and its working position when loaded against the force of the spring.

The cable is in this context in general at one end connected to the extension and at the opposite end to the holding arms. The cradle engages with its extension in the guide sleeve telescopically. The telescoping movements correspond on the one hand to the rest position and on the other hand to the working position of the cradle. Here the telescoping movements are transmitted from the extension to the holding arms, namely by the connecting cable.

A particularly functionally reliable and simple implementation can be achieved in that the extension and the guide sleeve on the one hand are cylindrical and on the other hand corresponding hollow cylindrical. I.e., the cylindrical extension advantageously engages the corresponding tubular and cylindrical guide sleeve. This enables the telescoping movement of the cradle relative to the anchor element or the guide sleeve.

For support of the instrument body on or on the cradle, it is generally equipped with two supports. Here the respective support in side view can each be L-shaped.

In this way the instrument body can typically be placed on the largely horizontally extending L-leg, whereas the vertical or predominantly vertical L-leg of the L-shaped support ultimately merges with the extension or is connected to it, and the stem is in turn telescopically guided in the guide sleeve.

Here the supports in general in cross-section are cylindrical. In addition, the supports each telescopically engage for size adaptation to the musical instrument to be recorded in associated receptacles sleeves. This additional telescopability of the support relative to the associated receptacles, allows a permanent adaptation to the relevant musical instrument or the instrument body. This can be distinguished from the fundamental telescoping ability of the cradle relative to the anchor element between the rest position and the working position.

In any case the two sleeves are connected to the extension and respectively join to form the extension, imparting an inverted Y-shape to the extension and two supports. The two receptacle sleeves merge into the extension stem that engages telescopically in the guide sleeve of the anchor element and are biased against the force of the spring. This allows the cradle to assume the described rest position when not loaded and the working position when loaded with the musical instrument compressed.

The two arms engaging around the instrument neck in general lie and move in a common holding plane. The holding plane in question is thereby advantageously horizontal and perpendicular to a positioning plane. The positioning plane is thereby defined by the empty cradle movement relative to the anchor element or the guide sleeve. I.e., the change of the cradle from the rest position to the working position defines the positioning level, whereas the holding level is described by arms both in the open position and closed position. The holding level and the position level are thereby predominantly oriented perpendicular to each other.

In general the cable passes through the spring. In addition the spring is typically helical. In addition the spring is generally in the form of a compression spring that is clamped between the holding arms and a stop in the anchor element. This has the consequence that the spring in question is compressed when changing the cradle from its rest position to the working position. This is because the change of the cradle from the rest position to the working position goes in general with a downward movement of the cradle caused by the weight of the musical instrument placed on it.

The cradle can be changed from the rest position to the working position immediately when the musical instrument is placed on the cradle or the holding fingers. However, it is also possible to link this change to release of a catch or latch that is used to releasably fix the cradle in the rest position. Only when the lock is released can the cradle move from its resting position to the working position, thereby acting on the holding arms via the cable.

This downward movement of the cradle has the consequence that the cable exerts a tensile force on the end of the holding arms connected to the cable. At the same time this compresses the compression spring. The tensile force exerted on the two retaining arms ensures that the holding arms are transferred from their previously assumed open position into the closed position, namely against the force of the spring in question.

This results in a particularly flexible, functionally fair and mechanically simple structure. This is at the same time characterized by a particularly low weight, which facilitates its handling.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
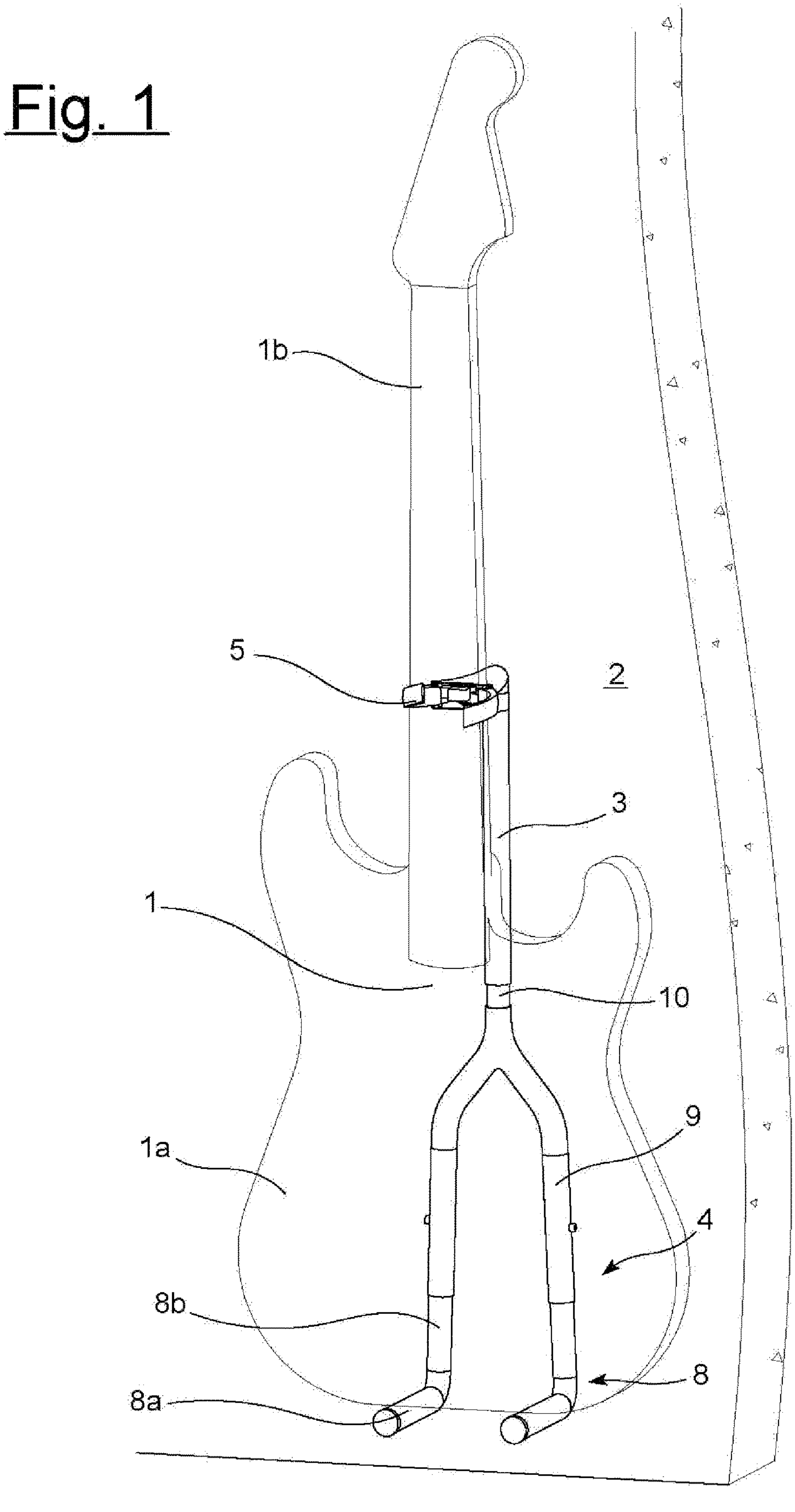
FIG. 1 is a perspective view of a wall-mount holder according to the invention and a guitar.

The drawing shows a holder for a musical instrument 1 that in this embodiment is constructed without limitation as a wall mount for hanging the instrument 1 by securing an anchor part 3 to a wall 2. In principle and alternatively the holder could also be designed as a floor stand, in which case the element 3 is not attached to the wall 2, but is supported on the floor via, for instance, a leg assembly.

The holder according to the invention has in its basic structure in addition to the previously already mentioned anchor element 3 an adjustable cradle 4 designed to support a body 1*a* of the musical instrument 1 from below. Here the musical instrument 1 is by way of example a guitar and in particular an electric guitar, although the invention can be used with any string instrument having a body 1*a* and neck 1*b*.

Figure 3:
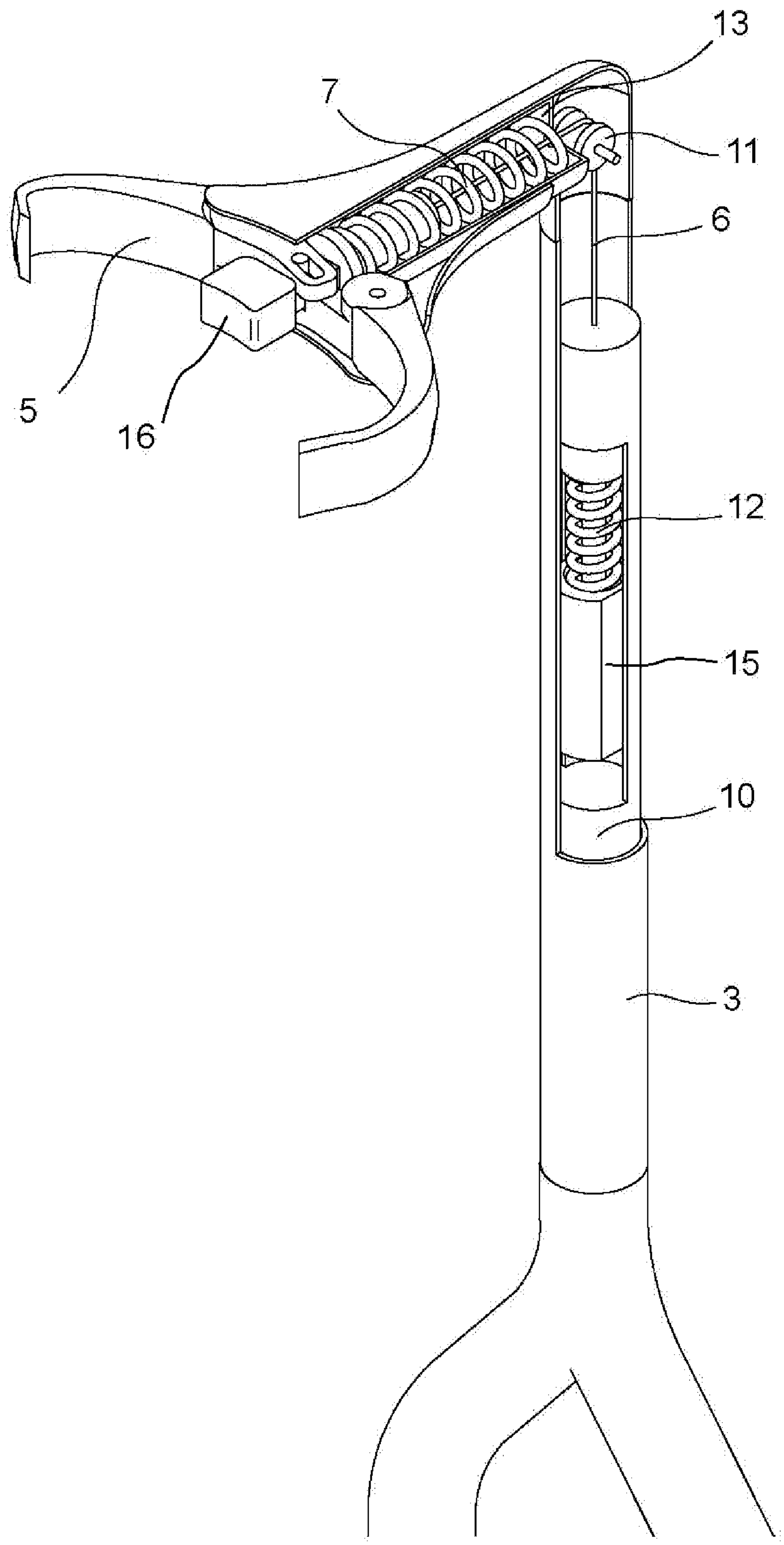
FIG. 3 is an enlarged partly sectional view of the upper arm assembly in the open position.
Figure 4:
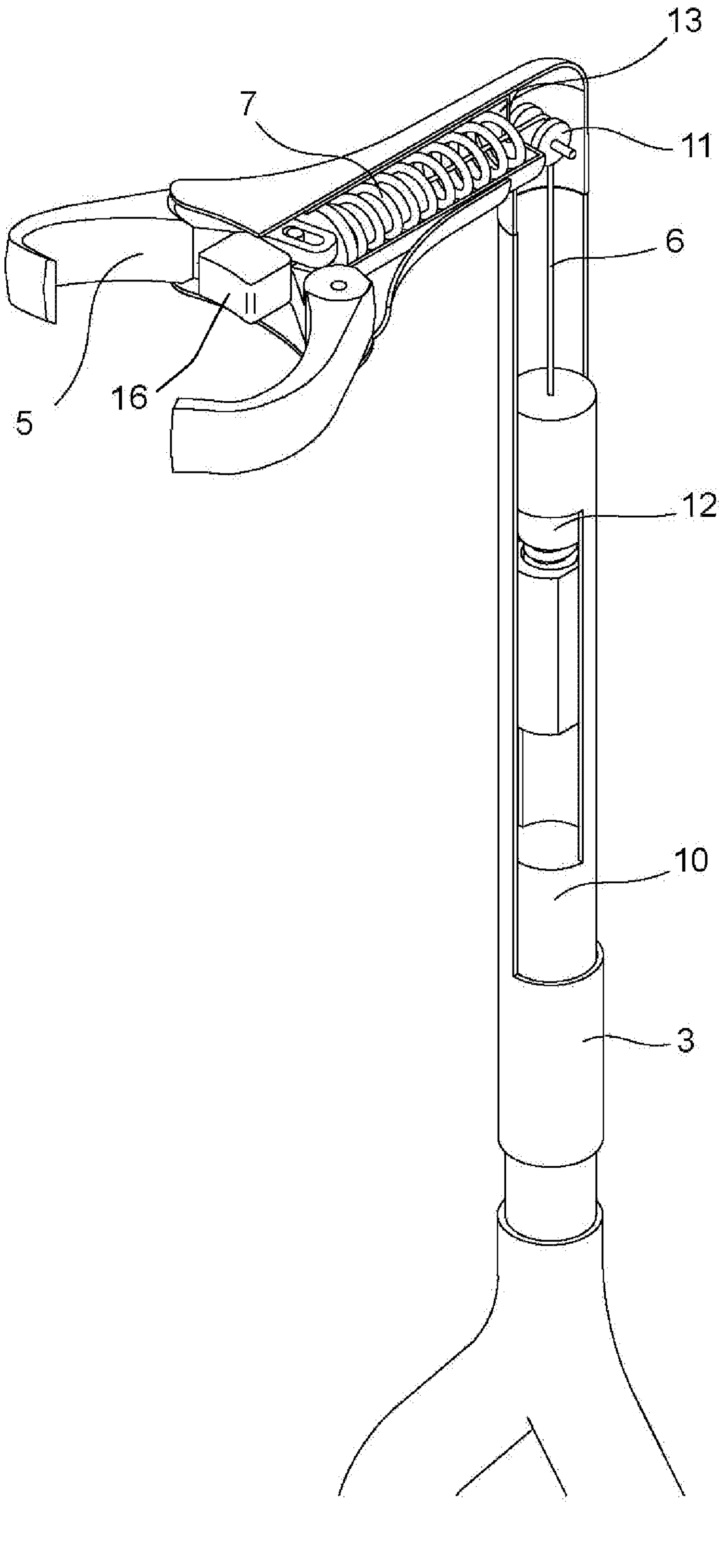
FIG. 4 is a further enlarged partly sectional view like FIG. 3 but in the closed position of the arms.

At least two holding arms 5 are pivotally mounted at the upper end of the anchor element 3 and serve to engage around and grip the neck 1*b* of the musical instrument 1. The cradle 4 and the two holding arms 5 are coupled to each other via at least a linkage or connecting member formed as a cable 6. A spring 7 engaged between the anchor part and inner ends of the arms 5 urges the arms 5 into the spread or open position shown in FIGS. 1 and 3 and in solid lines in FIG. 2 and also urges the cradle 4 into an upper position shown in dot-dash lines in FIG. 2 and solid lines in FIGS. 1 and 2. The two holding arms 5 extend at different heights and fit around the instrument neck 1*b* in a closed position in a helix as shown in FIG. 4, but in FIGS. 1-3 are in one plane SE.

Figure 2:
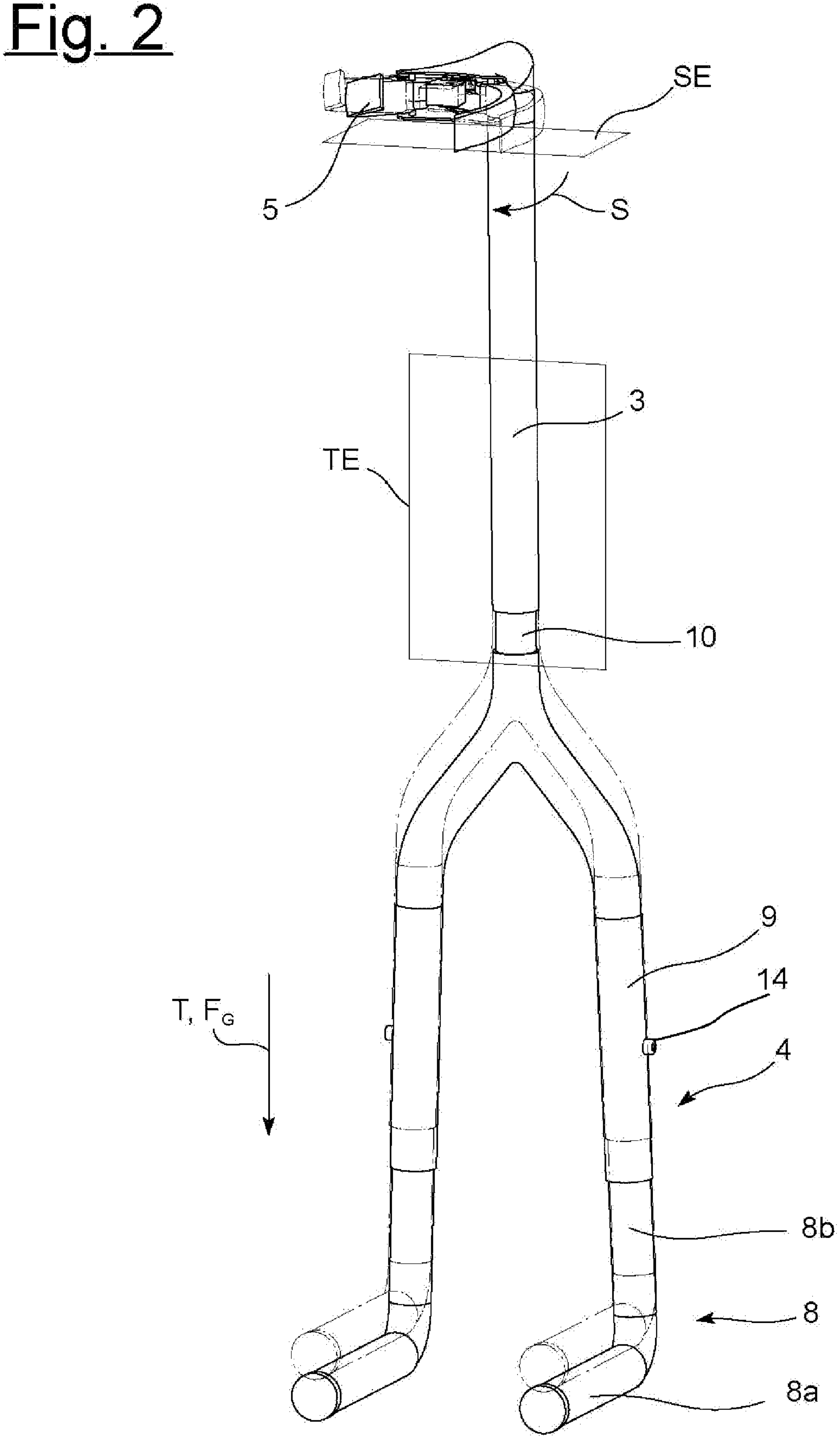
FIG. 2 shows the holder without the musical instrument schematically in an overview showing the holding arms in the open and closed positions and the cradle in its rest and working positions.

In a rest position of the cradle 4 corresponding to the open position of the two holding arms 5 according to the dash-dot representation in of FIG. 2, the musical instrument 1 can be placed on the cradle 4. For this purpose the instrument body 1*a* is placed on at least two supports 8 of the cradle 4, as can best be understood by comparing FIGS. 1 and 2. According to this embodiment, the supports 8 as a component of the cradle 4 are each L-shaped in side view. In fact, the supports 8 have mostly horizontally extending L-legs 8*a* and in contrast predominantly vertically extending further L-legs 8*b*. This allows the instrument body 1*a* to be placed on the predominantly horizontally extending L-legs 8*a* of the support 8.

The supports 8 are cylindrical in cross-section. Here they are bent tubes made for example of steel or a suitable metal or also of plastic. The same applies to the anchor element 3. In addition, the supports 8 each telescope for size adjustment to the musical instrument and specifically the instrument body 1*a* in the respective sleeves 9. In fact, the vertically extending L-legs 8*b* can be moved vertically in respective sleeves 9 associated with regard to their insertion length. For this purpose, each and vertically extending L-leg 8*b* can be latched in the respective sleeve 9 in a vertical position by a respective screw 14.

The two sleeves 9 are downward extensions of a vertical cylindrical stem 10 that connects them together and form aan inverted Y-shaped part with the upper ends of the two sleeves 9 meeting at the lower end of the extension stem 10. An additional inclination of the receiving sleeves 9 to each other as well as the supports 8 can accommodate a curved design of the instrument body 1*a* when sitting on the L-legs 8*a* of the support 8.

The weight $F_G$ of the instrument 1 when placed on the supports 8 moves them from the upper rest position shown in dot-dash lines in FIG. 2 to the lower working position shown in solid lines. This action compresses the spring 7 and pulls back a pusher block 16 connected to the inner ends of the arms 5. This downward movement of the support 8 relative to the anchor part 3 into the rest position is shown in FIG. 2 by an arrow T. Previously, a latch not shown and described above may have been released.

Compression of the spring 7 and the downward movement T of the cradle 4 also pivots the two holding arms 5, namely starting from their dot-dash open position in FIG. 2 to the solid-line open position. This is indicated by a positioning movement S of the holding arms 5 in a holding plane SE that is perpendicular to a generally vertical plane TE of the anchor part. The result is that the arms engage around and grip the neck 1*b* of the instrument 1. The user thus naturally sets the neck 1*b* between the arms 5 in their open position, then sets the body 1*a* down on the supports 8, and releases the instrument 1 so that its weight automatically closes the arms 5 around the neck 1*b*, ensuring that the instrument is securely held in place. The weight $F_G$ does the work.

To remove the musical instrument 1 from the holder again, it is only necessary to lift it. This will take the weight $F_G$ off the supports 8 so that they will move upward and the spring 7 will push the inner ends of the arms 5 out so they will open and release the neck 1*b*. Thus, the instrument 1 can be seated in the stand/mount of this invention using one hand in completely natural movements. The unillustrated releasable catch may be closed.

As already explained and according to the invention the connecting member 6 is a cable extending between the cradle 4 and the two holding arms 5. This cable 6 is guided for protection against any damage and soiling completely or partially inside the anchor element 3. For this purpose the anchor element 3 is designed according to this embodiment as a guide sleeve for the cable 6. The anchor part 3 is mainly a sleeve that wholly contains the cable 6, which of course is only by way of example applies and is not mandatory. The spring 7 is also contained in the anchor part 3.

As also already explained, the cradle 4 engages with its extension stem 10 in the guide sleeve of the anchor element 3. This allows the extension 10 to telescope inside the guide sleeve 3. The cable 6 is connected on the one hand to the extension 10 and on the other hand to the holding arms 5. Here the cable 7 is guided according to this embodiment over a deflection pulley 11 made of plastic.

The extension 10 is cylindrical according to this embodiment. In contrast, the anchor part 3 has a complementary cylindrically tubular shape, so that the extension 10 can telescope inside it. It can be seen that the spring 7 according to this embodiment is a helical coil spring. The cable 6 extends coaxially through the sleeve-shaped anchor part 3.

In addition a damper 12 is provided inside the tubular guide/anchor part 3. It damps movement of the cradle 4 with respect to a part 15 of the anchor part 3 and damps in particular hard impacts, for example, if the musical instrument 1 is removed from the cradle 4, so that as a consequence of this the cradle 4 is abruptly moved toward its rest position by the force of the spring 7. The spring 7 is according to this embodiment designed as a compression spring. In this way the spring 7 ensures that it can be clamped between the inner ends of the two pivotal retaining arms 5 and a stop 13 in the anchor element 3. A pusher element 16 connected to the inner arm ends is normally engaged by the instrument neck 1*b* when it is set in the holder of this invention. Corresponding compression of the spring 7 ensure that the holding arms 5 pivot into their open position shown in dot-dash lines so long as the holding arms 5 are not acted upon by a pull on the part of the cable 6, as soon as a musical instrument 1 with its instrument body 1*a* is placed on the cradle 4. This is because the holding arms 5 then assume their fully closed position against the force of the spring 7.

I claim:

1. A holder for a musical instrument having a body and a neck, the holder comprising:
- an anchor element adapted to be secured to a wall or stand on a floor;
- a cradle movable on the anchor element between a lower working position and an upper rest position and adapted to support the body of the instrument;
- a pair of arms pivotal on the anchor element between a closed position engaging around and securing the neck of the instrument supported on the cradle and an open position not surrounding the neck;
- a cable at least mostly contained in the anchor element and connected between the arms and the cradle for moving the arms into the closed position on movement of the cradle into the lower position; and
- a spring connected to the arms, cable, and/or cradle for urging the cradle into the upper position and the arms into the open position, whereby setting the instrument body on the cradle moves same into the lower position and causes the arms to engage around the neck of the instrument.

2. The holder according to claim 1, wherein the anchor element is largely formed as a guide sleeve internally accommodating the cable.

3. The holder according to claim 2, wherein the cradle is provided with an upward extension stem engaged in the guide sleeve.

4. The holder according to claim 3, wherein the extension stem telescopes in the sleeve.

5. The holder according to claim 4, wherein the cable has one end connected to the arms and an opposite end connected to the extension stem.

6. The holder according to claim 5, wherein the extension stem and the guide sleeve are complementarily cylindrical.

7. The holder according to claim 1, wherein the cradle is provided with an upward extension stem engaged in the guide sleeve; wherein the cradle is further provided with two supports.

8. The holder according to claim 7, wherein each of the supports are L-shaped with a horizontal leg adapted to engage under the instrument body and a vertical leg connected to the stem.

9. The holder according to claim 7, wherein the legs of the supports are cylindrical.

10. The holder according to claim 7, wherein the supports each include a cylindrically tubular upper part in which the respective vertical leg telescopes, whereby instruments of different sizes can be accommodated by the supports.

11. The holder according to claim 10, wherein the tubular upper parts are fixed to the extension stem.

12. The holder according to claim 1, wherein the arms are pivotal in a common plane.

13. The holder according to claim 12, wherein the plane is generally perpendicular to a plane of the anchor element.

14. The holder according to claim 1, wherein the cable passes through the spring.

15. The holder according to claim 1, wherein the spring is compressed between the anchor element and the arms.

* * * * *